[72] Inventor Irwin Schneider
2402 Daphne Lane, Alexandria, Va. 22306
[21] Appl. No. 708,299
[22] Filed Feb. 26, 1968
[45] Patented May 25, 1971

[54] INFORMATION STORAGE WITH OPTIC MATERIALS
8 Claims, 4 Drawing Figs.
[52] U.S. Cl. ..................................... 356/256,
350/147, 350/160(R), 356/114
[51] Int. Cl. ..................................... G02b 27/28,
G02f 1/16
[50] Field of Search ........................... 350/160;
356/256; 340/173, 173 (Light)

[56] References Cited
UNITED STATES PATENTS
3,123,711 3/1964 Fajans ........................... 250/71
3,253,497 5/1966 Dreyer .......................... (340/173)UX
3,296,594 1/1967 Van Heerden ................. 331/94.5X
3,447,138 5/1969 Carson et al. .................. 340/173
3,466,616 9/1969 Bron et al. ..................... 350/321(OSR)UX Primary Examiner—John K. Corbin
Attorneys—R. S. Sciascia and A. L. Branning ABSTRACT: Anisotropic color centers, such as the $M_A$ center in optical materials like sodium doped potassium chloride crystals, are used for the storage of information. The color centers are first oriented in a common lattice direction with polarized light, and information is then stored by effectively causing reorientations of the color centers with radiation of the same wavelength but of altered polarity. The information is read with polarized light at a second longer wavelength. Optical materials are particularly useful for computer storage elements since they have a substantially greater information storage capacity than conventional magnetic core memories. Apparatus employing the optical storage material is also disclosed.

INVENTOR
IRWIN SCHNEIDER

PATENTED MAY 25 1971

INVENTOR
IRWIN SCHNEIDER

BY
ATTORNEY

INFORMATION STORAGE WITH OPTIC MATERIALS

The invention described herein may be manufactured and used by or for the Government of the United States of America for governmental purposes without the payment of any royalties thereon or therefor.

BACKGROUND OF THE INVENTION

1. Field of the Invention

This invention relates to an information storage system and more particularly to one employing optic materials which become dichroic by virtue of the fact that they contain oriented anisotropic color centers. Information is stored in the optic materials by effecting changes in the direction of orientation of the color centers.

Anisotropic color centers behave like atomic-sized dipoles absorbing light of certain wavelength when the light happens to have a component of polarization parallel to the dipole axis. In the crystal, the dipole axis for a particular center lies along one of several possible crystallographic directions depending upon the orientation of the center itself. The reorientation process involves changing the direction of these dipolelike color centers from one or more crystallographic directions to some other predetermined crystallographic direction or directions, for example, the $M_A$ center, i.e., the intrinsic M center which lies next to an impurity ion, can randomly appear along one of six possible lattice directions. With polarized light it is possible to align practically all the centers in a crystal along just one of these directions so that plane polarized light in the crystal is absorbed when its polarization vector lies along the color center axis and is not absorbed when its vector is perpendicular to the center's dipole axis.

2. Description of the Prior Art

Optical materials are normally used to store or remove information by simply creating or destroying color centers of a particular type. These centers are often responsible for and can be detected by their absorptions. Typical of such an application is U.S. Pat. No. 3,253,497, to Dreyer. Information is stored by exciting the F center with visible light. Another F-center storage system is disclosed by Van Heerden U.S. Pat. No. 3,296,594.

Color centers are a class of point defects observed primarily in alkali halides. The most common of these is the F center. It is one of the simplest and best understood color center consisting of an electron trapped at a halogen ion vacancy. The F center absorbs light usually in a visible region of the spectrum. This absorption corresponds to the transition of the F-center electron from its ground state to an excited state. Often this excitation results in the conversion of F centers into other color centers. The F center absorption decreases with excitation as other absorptions, due to other centers, appear. At room temperature this excitation results in conversion of F centers first to M centers and then to R centers. These centers can to some extent be bleached with light which excites these centers. Changes in the coloration of a crystal occur whenever F centers with their characteristic absorption (the F band) are converted by optical excitation to other color centers having absorptions at other spectral locations.

This change in coloration due to irradiation has been used to store information, as previously noted, by bleaching or creating F centers. Binary information is stored or removed by optically creating or destroying the F centers and its associated absorption band. However, such a system has certain drawbacks. For example, irradiation of F centers, which results in their conversion to other centers, is often at least partially irreversible, the color centers having a tendency to fatigue after brief use. This appreciably shortens the life of such a crystal memory and decreases its reliability as a storage system since some color centers previously used for storage are irreversibly destroyed.

A further problem is that the stored information must be capable of being read without erasing the information which had been stored. Even the use of subdued intensities of radiation or use of long wavelengths for monitoring information causes excitation of the F center. Storing the information while the crystal is maintained at one temperature and later cooling the crystal to prevent destructive readout may be possible but is undesirable because of substantial losses in access time. A nondestructive readout is also a major problem associated with purely electron transfer process such as in F to F' center conversion processes at low temperatures.

Another difficulty is one which is related to the problem of achieving a high density storage by these techniques. In order to obtain as large a density as possible, coloration is confined to as narrow a layer of crystal as possible because of optical resolution problems. This effectively reduces the maximum achievable total coloration absorption. Yet accurate detection with monitoring light beams requires the absorption of as much light as possible. Optical memories have generally faced one or more of the aforementioned difficulties because their readout processes have necessarily been restricted to the measurement of changes using unpolarized light at room temperature.

SUMMARY OF THE INVENTION

The general purpose of this invention is to provide an information storage material and apparatus which has the advantages of the aforementioned memories, principally the storage of large quantities of information in a very small area, and has none of the above-described disadvantages. To attain this, the present invention utilizes optic materials having uniquely optically oriented anisotropic color centers. Examples of such materials are alkali halides such as potassium chloride, potassium bromide, potassium iodide, sodium chloride, or the like which are characterized by anisotropic color centers, such as the M, $M_A$, R, N centers or the like, that are produced in these optic materials and oriented in a common direction by polarized radiation. Information is stored by realigning or reorienting the axis of the anisotropic centers along specific and predetermined directions.

Of particular value for information storage, in accordance with the instant invention, is the $M_A$ color center maintained at low temperature in these materials. The $M_A$ centers have the combined features of being stable, of reorienting reversible, of providing a nondestructive readout, and of finally providing a polarized dichroic emission as well as dichroic absorption band for readout. The use of the $M_A$ center dichroic emission band for readout purposes is substantially superior to using absorption techniques because it is easier to detect and would require fewer centers in a given volume of memory material. This in turn allows use of thinner crystals having fewer color centers and reduces optical distortion caused by crystal thickness. The combined effect is a closer approach to the theoretical maximum storage capacity of optical memory systems, namely $10^8$ bits/cm. for 1um light.

Another advantage of the anisotropic color centers of this invention is that they are completely stable when oriented at cryogenic temperature, say below about 200° K. so that their concentration always remains constant. The reorientation processes are thus completely reversible so that fatigue is not a problem and the crystals can be used repeatedly for an indefinite period of time. This nondestructive reversibility of the $M_A$ centers apparently arises from the fact that they simply involve rotations about sodium ions which are in the crystal lattice.

Information is read nondestructively at the same crystal temperature by illuminating the material with radiation lying at longer wavelengths than that used to write with. Such irradiation causes emission of radiation without reorientation of the color centers thereby enabling one to detect through dichroic emission measurements (i.e. emission using interposed polarizers) far smaller changes in the numbers of oriented centers than would be possible using absorption measurement techniques.

An object of this invention is to provide an optic material with anisotropic color centers which are substantially aligned in a common direction prepared for the storage of information by means of reorientation caused with polarized light.

Another object is to provide a memory storage material having anisotropic color centers which are completely reversible, are easily reoriented in a predetermined direction, are stable and do not fatigue.

A further object of the invention is to provide an optical memory readout of information by emission.

A further object of the invention is to utilize optic materials having anisotropic color centers which achieve a high information density optical storage.

BRIEF DESCRIPTION OF THE DRAWINGS

Other objects and many of the attendant advantages of this invention will be readily appreciated as the same becomes better understood by reference to the following detailed description when considered in connection with the accompanying drawings and wherein.

DESCRIPTION OF THE PREFERRED EMBODIMENT

Figure 1:
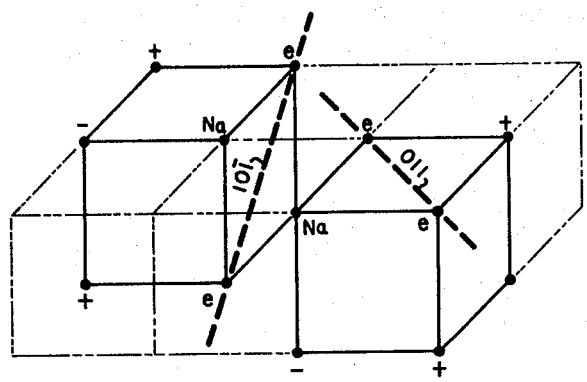
FIG. 1 and FIG. 2 are diagrammatic views of a portion of the crystal lattice of an optical material of this invention used for information storage.
Figure 2:
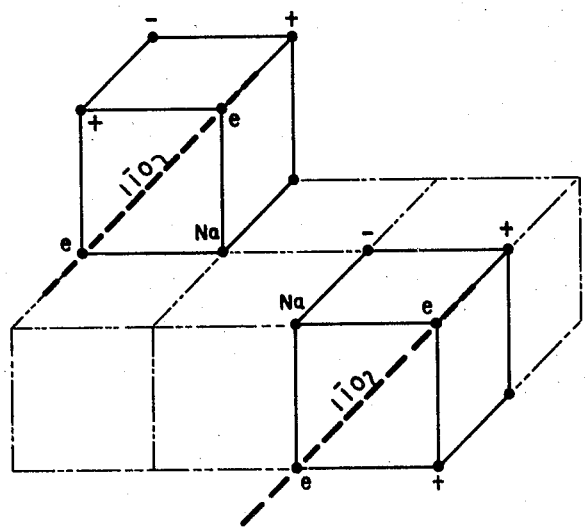

Referring in more detail to FIGS. 1 and 2, there is shown a portion of the simple cubic lattice of an alkali halide crystal, for example, potassium chloride. Potassium ions are represented by the plus signs while chloride ions are represented by the minus signs. Controlled sodium impurity is represented by the chemical symbol for sodium (Na) and trapped electrons by symbol $e$.

Two $M_A$ centers are shown in FIG. 1. When initially produced, the $M_A$ centers form randomly and are equally distributed along the six directions in concentrations which are of the order of $10^{17}$ centers per cubic centimeter. The two centers, for purposes of illustration, are shown along the $10\bar{1}$ direction and the other in the $011$ direction in the crystal lattice.

$M_A$ centers are prepared by first growing a potassium chloride crystal containing sodium chloride. Concentrations of from 0.1 mole percent to 1 mole percent of sodium impurity are satisfactory with 0.3 mole percent of sodium preferred, which can give moderately large $M_A$ center concentrations. A melt of potassium chloride containing the desired concentration of sodium purity is prepared. A potassium chloride seed is inserted into the melt. The crystal is grown by simply maintaining the liquid salts at temperature just above the melting point and slowly drawing the seed from the melt.

Color centers usually in the form of F centers are introduced into the grown, clear crystal either through the use of ionizing irradiations such as ultraviolet light etc. or by a process known as additive coloration. In the former method, the coloration thickness is predetermined by selecting the proper ionizing energy, for example, a 0.006 cm. thick coloration occurs for 100 kev. electrons; a 0.001 cm. coloration occurs for 10 kev. electrons. Additive coloration involves heating the crystals with a pellet of alkali metal in a closed bomb and rapidly quenching the crystal to room temperature. The coloration thickness is determined by simply limiting the thickness of the colored crystal.

Figure 3:
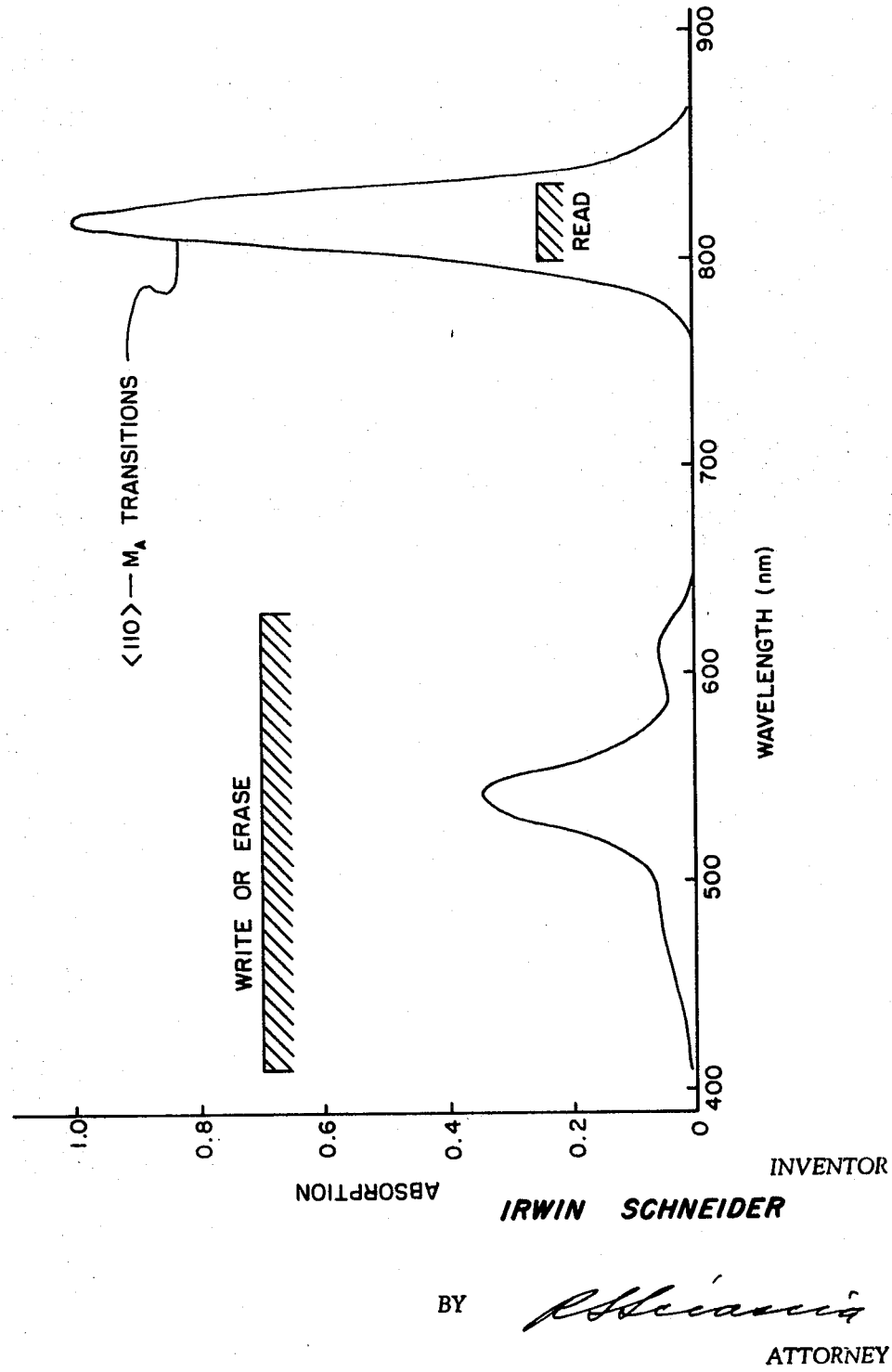
FIG. 3 is a plot of absorption for the preferred optical material, namely, a sodium doped potassium chloride crystal.

The crystal containing F centers is next exposed to unpolarized light which is absorbed by F centers, for example, around 560 nm. for potassium chloride (see FIG. 3). This exposure is carried out at room temperature until a maximum number of $M_A$ centers form from the F centers. This point is determined by monitoring the $M_A$ band at about 820 nm.

The crystal is mounted on the cold finger of a dewar cooled to some fixed cryogenic temperature below about 200° K. and preferably liquid-nitrogen temperature (77° K.). The crystal is exposed to polarized light incident normal to the crystal until a substantial number of the $M_A$ centers, 98 percent or more of the $M_A$ centers present in the potassium chloride are aligned along a single $<110>$ lattice direction. This is illustrated by FIG. 2 which shows the two $M_A$ centers previously located along the $10\bar{1}$ and $011$ axes in FIG. 1 now oriented along a $1\bar{1}0$ axis.

The operation of the material as a memory device is best shown by FIG. 3 wherein the absorption characteristics of the $M_A$ center for sodium doped potassium chloride is plotted. Once substantially all the $M_A$ centers are aligned in a single $<110>$ direction, information is written on the crystal by irradiating it with light having wavelengths anywhere between 400—600 nm. shown as the "write" portion of FIG. 3. The reorientations are confined to certain predetermined areas in the crystal corresponding to the storage bits.

Information written as above is read by illuminating the crystal with radiation containing wavelengths about 820 nm. but excluding the "write" wavelengths. This technique excites the $M_A$ center without causing it to reorient. The $M_A$ center on illumination emits near infrared light (at 1080 nm.) and contains the same dichroism and information previously written into the crystal.

To erase the information, $M_A$ centers are reexposed to light with the original $<110>$ polarization lying between 400 to 620 nm.

Figure 4:
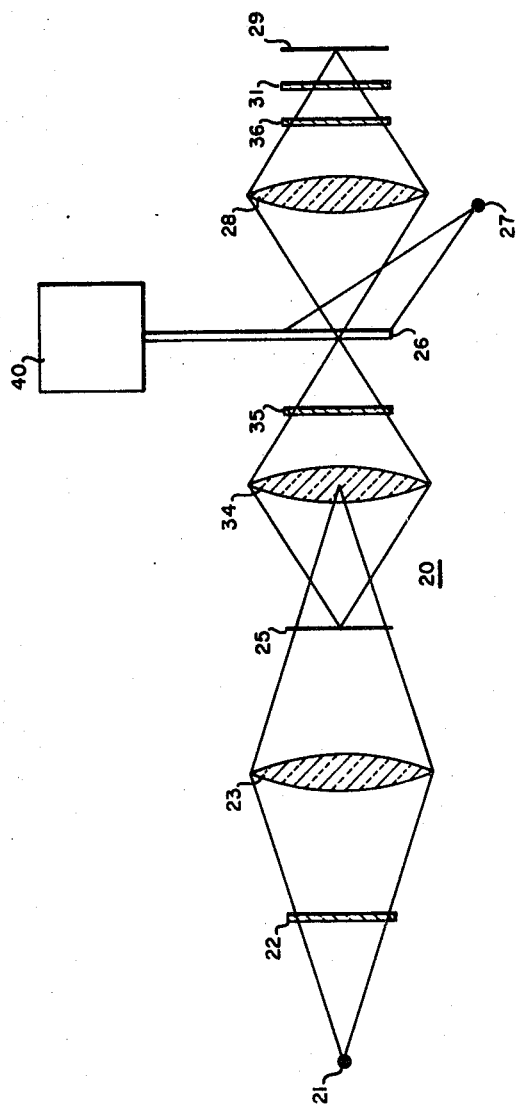
FIG. 4 is a diagrammatic view of one means for storing information using the optical material of this invention.

Now referring to FIG. 4 there is shown, in simplified diagrammatic view, one means for storing information by polarization of anisotropic color centers in the optical material of this invention. The memory system 20 consists of an optical storage material 26 having associated therewith means for writing in and reading out information. The optical material may be a single polished crystal or may be a substrate having a coating of the optical material, for example, a thin evaporated layer of doped alkali halide. The memory material 26 is mounted, in any suitable manner, on an optical dewar 40 for maintaining the memory at a low temperature.

The writing means includes a source of illumination or radiation 21 and filter 22 designed to pass desired wavelengths capable of reorienting the anisotropic color centers of memory 26. The radiation passing the filter is focused using lens system 23 to illuminate microfilm 25 and information contained therein is transferred to the memory 26 by focusing lens system 34. A polarizer 35 is placed between the microfilm 25 and memory 26 so that the writing radiation from source 21 is focused on the memory 26 in polarized form to cause reorientation of the memory color centers which are initially commonly aligned in a single direction.

Illuminating and reading means 27, for example infrared light, is directed incident to the rear side of memory 26.

The illuminating and reading means 27 employs radiation at the long wavelengths that does not cause anisotropic color reorientation but does cause emission. For example, wavelengths above about 620 nm. which includes 820 nm. causes a distinct emission at 1080 nm. for potassium chloride.

This emission is passed through a properly oriented infrared polarizer 36 to allow only the original polarized information, now in the form of emission, to be recorded on the infrared sensitive film 29. Emission from the excited memory is focused by the lens system 28 onto a sensitive film 29 after passing through a filter 31 which passes the emission to polarizer 36.

Prior to information storage the anisotropic color centers are aligned in a common $<110>$ direction by replacing film 25 with a frosted glass and allowing radiation from source 21 to impinge on the optical material 26 until there is achieved maximum absorption in one direction of polarization with virtually no absorption perpendicular to it.

Illustrative of the operation of the information storage system shown in FIG. 4 is a system employing a sodium doped potassium chloride memory. The memories anisotropic color centers are first aligned in a common direction by exposing the memory 26 to polarized light between 400 to 600 nm. This is done by providing a source of green light at source 21 which is filtered at 22 to pass wavelengths between 400 to 600 nm. This light is next polarized at 35 prior to illuminating memory 26. The memory is exposed to this light for a period of time sufficient to align substantially all the color centers. Film 25, containing information to be stored, is next placed in the storage system and illuminated by light from source 21. The image of the above illuminated film is next passed through polarizer 35, which has been rotated 90° from its previous position. Polarized light, passing polarizer 35, is focused on memory 26 and reorients those color centers impinged by the light.

To read, the stored image is illuminated with longer wavelengths of light, preferably 820 nm., which causes an emission at 1080 nm. from memory 26 without reorienting any color centers. This emission is passed through an infrared polarizer 36 which passes only the original polarized information, and recorded by infrared sensitive film 29.

Of course, many other optical reading and writing systems, for example, those set forth by Dreyer and Van Heerden may be used to introduce and remove information from the unique anisotropic color center optical memory of the invention provided the polarization techniques disclosed herein are employed. However, reading systems utilizing emission rather than absorption of illuminating light are preferred.

While the $M_A$ center of sodium doped potassium chloride is preferred, anisotropic color centers having high frequency absorption bands such as the M, N, R, or the like, existing in optical materials such as activated alkali halides, or the like, may be employed.

Memories employing anisotropic color centers are simple to fabricate, require no memory connections or memory circuits as to magnetic cores, are less costly to prepare, have lower requirements for electrical power, have reduced weight and size. The memory may be used to store, in addition to binary information, such information as maps, blueprints and other visual displays. The instant anisotropic memory centers do not fatigue, are completely reversible do not bleach over a long period of use, and employ emission property so that absorption readout is not necessary. These properties make anisotropic color centers the most useful of the color centers for information storage.

Obviously many modifications and variations of the present invention are possible in the light of the above teachings. It is therefore to be understood that within the scope of the appended claims the invention may be practiced otherwise than as specifically described.

I claim:
1. An information storage and display system comprising:
   an optical material having $M_A$ color centers capable of being aligned in a common direction;
   first illuminating means including polarized radiation operatively associated with said material to align substantially all said $M_A$ color centers in a common direction;
   second illuminating means including polarized radiation of predetermined and different polarity from said first illuminating means operatively associated with said material to reorient said $M_A$ color centers in predetermined portions of said optical material whereby information is written into the optical material; and,
   detection means including third illuminating means and polarizing means for passing the original polarized information operatively associated with said material for determining the information state thereof.

2. The storage and display system of claim 1 in which said optical material is an alkali halide crystal.

3. The storage and display system of claim 2 in which said alkali halide is potassium chloride.

4. The storage and display system of claim 3 in which said potassium chloride contains from 0.1 to 1.0 mole percent sodium chloride.

5. The storage and display system of claim 4 in which said first illuminating means provides radiation having wavelengths at least between 400 nm. to 600 nm. and said second illuminating means provides radiation including wavelengths between 400 nm. to 600 nm. but of a different polarity.

6. The storage and display system of claim 5 in which said third illuminating means causes emission from the crystal in the near-infrared region.

7. The storage and display system of claim 2 in which said third illuminating means includes a radiation wavelength which is longer than the radiation in said first and second illuminating means.

8. The system of claim 1 wherein said third illuminating means causes the emission of polarized radiation from said material.